UNITED STATES PATENT OFFICE.

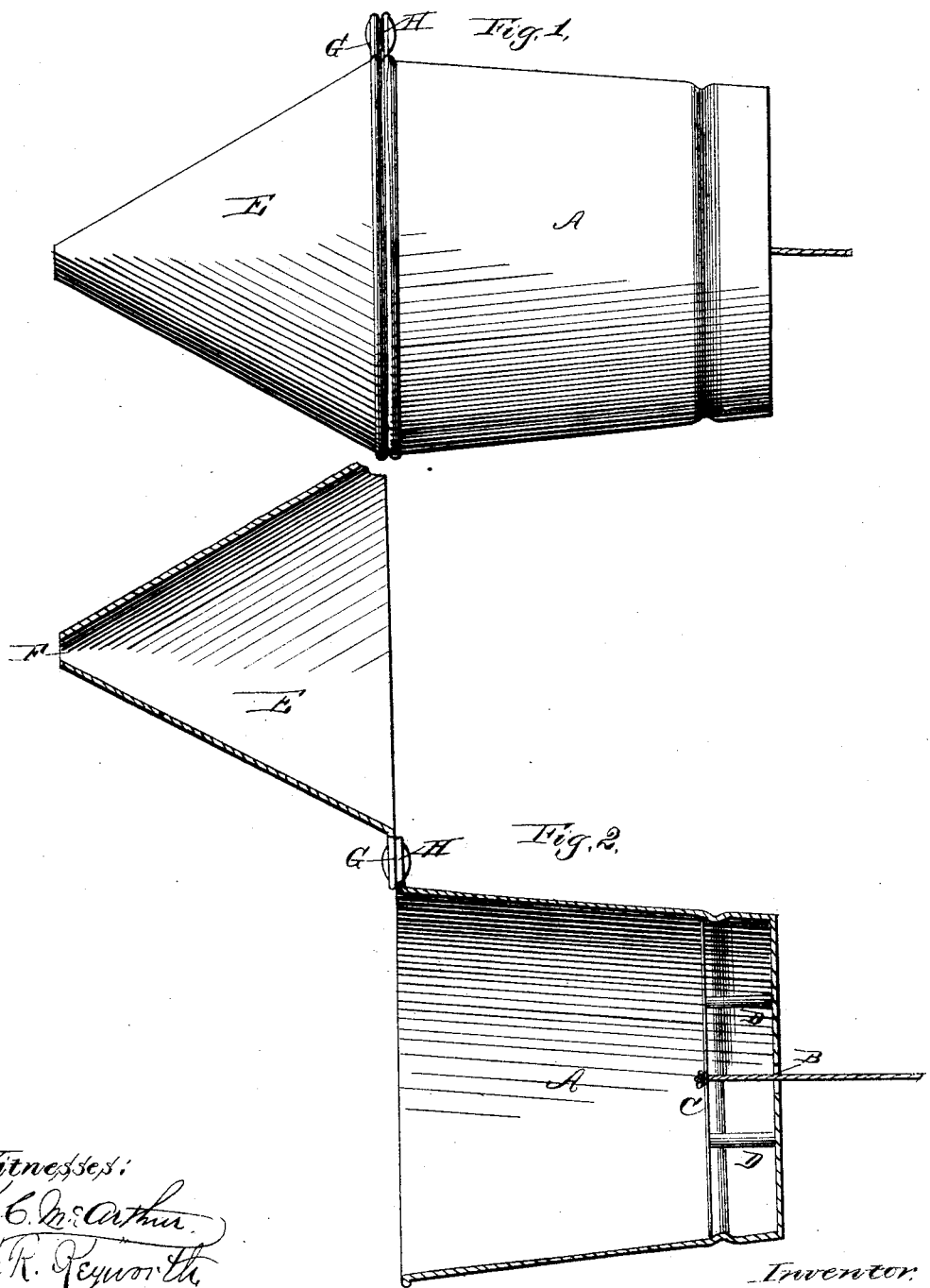

HENRY G. CADY, OF PINE BLUFF, ARKANSAS.

TELEPHONE.

SPECIFICATION forming part of Letters Patent No. 244,544, dated July 19, 1881.

Application filed June 13, 1881. (No model.)

*To all whom it may concern:*

Be it known that I, HENRY G. CADY, of Pine Bluff, in the county of Jefferson and State of Arkansas, have invented certain new and useful Improvements in Telephones; and I do hereby declare that the following is a full, clear, and exact description thereof, reference being had to the accompanying drawings, and to the letters of reference marked thereon, which form part of this specification.

This invention relates to certain improvements in acoustic telephones in which the vibrations of the diaphragm of the transmitting-instrument are conveyed mechanically to the diaphragm of the receiving-instrument by means of a suitable connecting cord or wire; and the invention has for its object to provide an instrument which can be used in the ordinary manner as a transmitter or a receiver at will, the instrument being provided with a movable condenser to concentrate the sound-vibrations when employed as a receiver, as more fully hereinafter specified. These objects I attain by the devices illustrated in the accompanying drawings, in which—

Figure 1 represents a side elevation with the device in position for receiving; and Fig. 2 a central vertical section, showing it as used for transmitting.

The letter A indicates a shell or casing constructed of suitable material, preferably in the form of a truncated cone. The said shell or casing is closed at its smaller end, and is provided at such end with a central perforation, B, through which the connecting cord or wire extends. Within the shell or casing, near the closed end thereof, is located a diaphragm, C, of thin metal, capable of being put in vibration by the action of sound-waves directed against it at the open end of the instrument or transmitted to it by means of the connecting cord or wire. The said diaphragm rests upon two sound-posts, D, by means of which the vibrations are imparted to the shell and the sound intensified when the instrument is employed as a receiver.

The letter E indicates a conical condenser provided with an aperture, F, at its apex. The said condenser is provided with a lug, G, at its edge, which is pivoted to a lug, H, at the edge of the open end of the casing or shell A in such manner that the condenser may be brought opposite the open end of the shell A or turned aside therefrom, as desired.

The operation of my invention is as follows: The instruments being properly mounted at their respective stations, the diaphragms are connected by a suitable cord or wire secured at its extremities in the center of said diaphragms and through the apertures or perforations B, the wires being so arranged as to clear the sides of the said apertures and stretched to a proper tension. To transmit a message the condenser is thrown back from the shell A at the transmitting-station, but is placed in position over the open end of the instrument at the receiving-station. Upon speaking into the open end of the instrument at the transmitting-station and listening at the condenser at the other the message at the receiving end will be heard in full volume. To return an answer it will be simply necessary to reverse the positions of the condensers at the ends of the line, which will convert the transmitter before mentioned into a receiver and the receiver into a transmitter, when the sounds can be transmitted in the opposite direction.

Having thus fully described my invention, what I claim, and desire to secure by Letters Patent, is—

In combination with the shell or casing and its diaphragm, the conical condenser pivoted to the edge at the open end of the casing, and adapted to be brought opposite the said open end or thrown away from the same to permit the device to be employed either as a transmitter or receiver, substantially as specified.

In testimony that I claim the foregoing as my own I affix my signature in presence of two witnesses.

HENRY G. CADY.

Witnesses:
J. A. HOOD,
L. McGREGOR.